(12) United States Patent
Kafle et al.

(10) Patent No.: US 10,129,839 B2
(45) Date of Patent: Nov. 13, 2018

(54) TECHNIQUES FOR SYNCHRONIZING TIMING OF WIRELESS STREAMING TRANSMISSIONS TO MULTIPLE SINK DEVICES

(71) Applicant: QUALCOMM Incorporated, San Diego, CA (US)

(72) Inventors: Padam Lal Kafle, San Diego, CA (US); Vijay Naicker Subramaniam, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/959,403

(22) Filed: Dec. 4, 2015

(65) Prior Publication Data

US 2016/0165558 A1     Jun. 9, 2016

Related U.S. Application Data

(60) Provisional application No. 62/088,395, filed on Dec. 5, 2014.

(51) Int. Cl.
*H04L 29/06* (2006.01)
*H04L 29/08* (2006.01)
*H04W 56/00* (2009.01)

(52) U.S. Cl.
CPC ....... *H04W 56/001* (2013.01); *H04L 65/4069* (2013.01); *H04L 65/4076* (2013.01);
(Continued)

(58) Field of Classification Search
CPC ............ H04L 7/0012; H04L 29/06517; H04L 29/06523; H04L 29/06455; H04L 65/4069;
(Continued)

(56) References Cited

U.S. PATENT DOCUMENTS 6,631,410 B1 * 10/2003 Kowalski ............. H04N 5/0736
                                                   348/E5.016
7,529,541 B2 *  5/2009 Cho ........................ H04L 29/06
                                                        370/359
(Continued)

FOREIGN PATENT DOCUMENTS

EP          2538689 A1    12/2012
WO    WO-2015130546 A1 *  9/2015 ............. H04L 65/80

OTHER PUBLICATIONS

ISA/EPO, International Search Report and Written Opinion of the International Searching Authority, Int'l. App. No. PCT/US2015/064147, dated Mar. 24, 2016, European Patent Office, Rijswijk, NL, 11 pgs.

*Primary Examiner* — Eric Nowlin
(74) *Attorney, Agent, or Firm* — Holland & Hart LLP/Qualcomm

(57) ABSTRACT

Methods, systems, apparatuses, and devices are described for synchronizing timing of wireless streaming transmissions to multiple sink devices. A source device may identify timing information associated with a common timing source, e.g., a media timing source at Multimedia layer or a Wi-Fi timing source, and send the timing information to the sink devices. The sink devices may receive the timing information and determine a composite timing delay, e.g., a wireless transmission link delay, an internal interface link delay, or combinations thereof. The source device may stream the content to the sink devices which may use a locally adjusted timing signal to synchronize the presentation of the content.

30 Claims, 10 Drawing Sheets

(52) U.S. Cl.
CPC .......... *H04L 65/4084* (2013.01); *H04L 65/80* (2013.01); *H04L 67/104* (2013.01)

(58) Field of Classification Search
CPC ............. H04L 65/4076; H04L 65/4084; H04L 65/608; H04L 65/80; H04L 67/104; H04L 69/28; H04L 7/08; H04L 65/607; H04W 56/001; H04W 56/002; H04W 56/00; H04W 84/12; H04N 5/04; H04N 5/06; H04N 21/4305; H04N 21/4307; H04N 21/434; H04N 21/4341; H04N 21/43637; H04N 21/8547
See application file for complete search history.

(56) References Cited

U.S. PATENT DOCUMENTS

| | | | | |
|---|---|---|---|---|
| 7,693,157 | B2* | 4/2010 | Zuberi | H04L 43/50 370/395.41 |
| 7,792,158 | B1* | 9/2010 | Cho | H04J 3/0664 370/350 |
| 7,907,212 | B2* | 3/2011 | Girardeau, Jr. | H04N 21/2368 348/515 |
| 8,036,227 | B2* | 10/2011 | Zuberi | H04L 43/50 370/395.41 |
| 8,073,060 | B2* | 12/2011 | Compton | H04N 21/4305 348/500 |
| 8,179,925 | B2* | 5/2012 | Huang | H04J 3/0685 370/512 |
| 8,340,656 | B2* | 12/2012 | Manne | H04N 21/242 370/324 |
| 8,401,090 | B2* | 3/2013 | Compton | H04N 21/4305 348/500 |
| 8,447,003 | B2* | 5/2013 | Tatsuta | H04N 21/4305 375/215 |
| 8,671,302 | B2* | 3/2014 | Manapragada | H04L 7/08 370/328 |
| 8,707,381 | B2* | 4/2014 | Polumbus | G06F 17/30746 725/131 |
| 8,768,252 | B2* | 7/2014 | Watson | H04R 5/02 381/300 |
| 8,855,192 | B2* | 10/2014 | Sagi | H04L 65/602 375/240.01 |
| 8,861,505 | B1* | 10/2014 | de la Broise | H04J 3/0658 370/310 |
| 8,902,934 | B2* | 12/2014 | Hirsch | H04L 65/4076 370/258 |
| 8,914,835 | B2* | 12/2014 | Chen | H04N 21/23439 709/231 |
| 9,007,384 | B2* | 4/2015 | Brijesh | G09G 3/2096 345/520 |
| 9,020,437 | B2* | 4/2015 | Watson | H04R 5/02 381/300 |
| 9,049,270 | B2* | 6/2015 | Poulain | H04H 20/103 |
| 9,226,011 | B2* | 12/2015 | Francisco | H04N 21/242 |
| 9,430,177 | B2* | 8/2016 | Thangadorai | G06F 3/1423 |
| 9,548,832 | B1* | 1/2017 | Cho | H04J 3/0664 |
| 9,621,987 | B2* | 4/2017 | Watson | H04R 5/02 |
| 9,661,425 | B2* | 5/2017 | Solum | H04R 25/554 |
| 9,699,559 | B2* | 7/2017 | Hammer | H04R 3/12 |
| 9,699,579 | B2* | 7/2017 | Carlsson | H04R 3/12 |
| 9,705,948 | B2* | 7/2017 | Wan | H04L 65/4076 |
| 9,717,018 | B2* | 7/2017 | Garudadri | H04L 29/06 |
| 9,788,117 | B2* | 10/2017 | Watson | H04R 3/12 |
| 9,788,140 | B2* | 10/2017 | Sole | H04W 4/008 |
| 9,854,284 | B2* | 12/2017 | Francisco | H04N 21/242 |
| 9,860,572 | B2* | 1/2018 | van Deventer | H04N 21/218 |
| 9,866,886 | B2* | 1/2018 | Jones | H04L 65/4076 |
| 2003/0007519 | A1* | 1/2003 | Murton | H04J 3/1611 370/539 |
| 2005/0259754 | A1* | 11/2005 | Ho | H04N 21/4305 375/240.28 |
| 2007/0143800 | A1* | 6/2007 | Salomons | H04N 7/163 725/74 |
| 2007/0220561 | A1* | 9/2007 | Girardeau, Jr. | H04N 21/2368 725/80 |
| 2007/0248100 | A1* | 10/2007 | Zuberi | H04L 43/50 370/395.41 |
| 2009/0006882 | A1* | 1/2009 | Manapragada | H04L 7/08 713/600 |
| 2009/0010192 | A1* | 1/2009 | Huang | H04J 3/0685 370/311 |
| 2009/0278984 | A1* | 11/2009 | Suzuki | G09G 5/003 348/554 |
| 2009/0298420 | A1* | 12/2009 | Haartsen | H04J 3/0658 455/3.06 |
| 2010/0061406 | A1* | 3/2010 | Tatsuta | H04N 21/4305 370/503 |
| 2010/0123826 | A1* | 5/2010 | Sagi | H04N 21/43637 348/467 |
| 2010/0172358 | A1* | 7/2010 | Zuberi | H04L 43/50 370/395.41 |
| 2011/0069230 | A1* | 3/2011 | Polumbus | G06F 17/30746 348/468 |
| 2011/0081900 | A1* | 4/2011 | Manne | H04N 21/242 455/422.1 |
| 2011/0099594 | A1* | 4/2011 | Chen | H04N 21/23439 725/105 |
| 2012/0005517 | A1* | 1/2012 | Foster | G06F 1/10 713/500 |
| 2012/0063603 | A1 | 3/2012 | Evans et al. | |
| 2012/0081606 | A1* | 4/2012 | Compton | H04N 21/4305 348/536 |
| 2012/0099594 | A1* | 4/2012 | Lau | H04L 12/2807 370/392 |
| 2012/0257642 | A1* | 10/2012 | Lee | H04N 21/2368 370/503 |
| 2012/0303705 | A1* | 11/2012 | Park | H04W 4/206 709/204 |
| 2012/0327300 | A1* | 12/2012 | Hutchings | H04N 21/42607 348/515 |
| 2013/0003757 | A1* | 1/2013 | Boatright | H04J 3/0697 370/474 |
| 2013/0188632 | A1* | 7/2013 | Sheth | H04N 21/4302 370/350 |
| 2013/0198292 | A1* | 8/2013 | Aaltonen | H04W 56/00 709/205 |
| 2013/0234913 | A1* | 9/2013 | Thangadorai | G06F 3/1423 345/2.1 |
| 2013/0322557 | A1* | 12/2013 | Poulain | H04H 20/103 375/259 |
| 2014/0010515 | A1* | 1/2014 | Lee | H04L 65/605 386/207 |
| 2014/0089990 | A1* | 3/2014 | van Deventer | H04N 21/218 725/61 |
| 2014/0184908 | A1* | 7/2014 | Perumanam | H04N 5/04 348/512 |
| 2014/0314067 | A1* | 10/2014 | Manapragada | H04L 7/08 370/350 |
| 2014/0359155 | A1* | 12/2014 | Wan | H04L 65/4076 709/231 |
| 2015/0201289 | A1* | 7/2015 | Solum | H04R 25/554 381/315 |
| 2015/0249967 | A1* | 9/2015 | Kafle | H04L 65/80 370/350 |
| 2015/0256906 | A1* | 9/2015 | Jones | H04L 65/4076 725/109 |
| 2015/0289003 | A1* | 10/2015 | Huber | H04L 65/4076 725/116 |
| 2015/0318977 | A1 | 11/2015 | Gelter et al. | |
| 2016/0142988 | A1* | 5/2016 | Powell | H04W 56/00 370/338 |
| 2016/0198427 | A1* | 7/2016 | Manapragada | H04L 7/08 455/502 |
| 2016/0262120 | A1* | 9/2016 | Shani | H04W 40/244 |
| 2017/0332131 | A1* | 11/2017 | Opsenica | H04B 10/116 |

* cited by examiner

800

TECHNIQUES FOR SYNCHRONIZING TIMING OF WIRELESS STREAMING TRANSMISSIONS TO MULTIPLE SINK DEVICES

CROSS REFERENCES

The present Application for Patent claims priority to U.S. Provisional Patent Application No. 62/088,395 by Kafle et al., entitled "Techniques for Synchronizing Timing of Wireless Streaming Transmissions to Multiple Sink Devices," filed Dec. 5, 2014, assigned to the assignee hereof, and expressly incorporated by reference herein.

BACKGROUND

The present disclosure, for example, relates to wireless communication systems, and more particularly to synchronizing presentation of content streamed from a source to multiple sinks.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

A mobile device may desire to share content with other mobile devices and other devices such as TVs, computers, audio systems, and the like. Typically one device (e.g., a source device) may wirelessly stream content to another device (e.g., a sink device) for presentation. Examples of a source device may include a smartphone, tablet, and the like. Examples of a sink device may include a TV, computer screen, speaker etc. In some applications, the source device may transmit the media stream over a Wi-Fi peer-to-peer wireless link or over an infrastructure wireless link. In situations where a source device streams content to multiple sink devices, presentation of the content at each sink device may require timing synchronization to avoid delays, echoes, etc. However, conventional methods of streaming content to multiple sink devices lack means for supporting synchronized presentation of the content to within a high degree of accuracy.

SUMMARY

The described features generally relate to one or more improved systems, methods, and/or apparatuses for streaming content from a source device to multiple sink devices that allow presentation of the content across the sink devices in a highly synchronized manner. In accordance with the present disclosure, a source device may determine or otherwise identify timing information associated with a common timing source, e.g., a wireless communication network timing that is common to the source and sink devices. The source device may send the timing information to the sink devices and participate in a procedure with the sink devices to determine aspects of a composite timing delay. The source device may stream the content to the sink devices which may present the content in a synchronized manner based on the composite timing delay, e.g., a composite timing delay that accounts for transmission delays as well as interface delays between various sub-assemblies, layers, etc., within a device.

At the sink device, the timing information may be received from the source device. The procedure may be performed with the source device to identify the composite timing delay associated with the common timing source. The sink device may adjust its timing based on the identified composite timing delay and use the adjusted time to synchronize presentation of the content. As each sink device may perform the composite timing delay procedure to adjust its time in relation to the common timing source, the content may be presented in a synchronized manner at each sink device that avoids echoes, delays, etc.

In a first set of illustrative examples, a method for wireless communication is provided. The method may include: identifying a composite timing delay associated with a common timing source; adjusting a sink device timing based at least in part on the identified composite timing delay; and using the adjusted sink device timing to synchronize the presentation of a content streamed from a source device to a plurality of sink devices.

In some aspects, the composite timing delay may include at least one of a first timing source delay, a second timing source delay, or a combination thereof. The first timing source delay may be associated with a multimedia layer and the second timing source delay may be associated with a wireless communication layer. The method may include: identifying a transmission link delay associated with wireless communications via the wireless communication layer; identifying an internal interface timing delay associated with each layer used to stream the content, the composite timing delay based at least in part on the transmission link delay and the internal interface timing delay; and adjusting a timing of the multimedia layer of the sink device based at least in part on the composite timing delay. Identifying the transmission link delay may include performing at least two rounds of exchanging timing measurement and acknowledgement frames with the source device. The internal interface timing delay may be associated with a delay for communications between the multimedia layer and the wireless communication layer in part for accessing the timing information.

In some aspects, the first timing source delay may be associated with a wireless communication layer and the second timing source delay may be associated with a multimedia layer. The method may include: identifying a timing instance from the wireless communication layer; identifying an internal interface timing delay associated with each layer used to stream the content; adjusting a timing of the multimedia layer to correspond to the timing instance from the wireless communication layer based at least in part on the internal interface timing delay; and determining a presentation time of a multimedia layer timing source by translating the presentation timestamp received with the streamed content based at least in part on the adjusted timing of the multimedia layer.

In some aspects, the common timing source may be associated with a generalized precision time protocol. The plurality of sink devices may communicate via a peer-to-peer network to the source device. The plurality of sink devices may communicate via an infra-structure network to the source device. The method may include receiving, from the source device, timing information associated with the common timing source, the common timing source used for streaming content to the plurality of sink devices. The content may be a multimedia content, an audio content, a video content, or combinations thereof.

In a second set of illustrative examples, an apparatus for wireless communication is provided. The apparatus may include: a processor; memory in electronic communication with the processor; and instructions being stored in the memory. The instructions being executable by the processor to: identify a composite timing delay associated with a common timing source; adjust a sink device timing based at least in part on the identified composite timing delay; and use the adjusted sink device timing to synchronize the presentation of a content streamed from a source device to a plurality of sink devices.

In some aspects, the composite timing delay may include at least one of a first timing source delay, a second timing source delay, or a combination thereof. The first timing source delay may be associated with a multimedia layer and the second timing source delay may be associated with a wireless communication layer. The apparatus may include instructions executable by the processor to: identify a transmission link delay associated with wireless communications via the wireless communication layer; identify an internal interface timing delay associated with each layer used to stream the content, the composite timing delay based at least in part on the transmission link delay and the internal interface timing delay; and adjust a timing of the multimedia layer of the sink device based at least in part on the composite timing delay. The instructions to identify the transmission link delay may be further executable by the processor to perform at least two rounds of exchanging timing measurement and acknowledgement frames with the source device.

In some aspects, the internal interface timing delay may be associated with a delay for communications between the multimedia layer and the wireless communication layer in part for accessing the timing information. The first timing source may be associated with a wireless communication layer and the second timing source may be associated with a multimedia layer. The apparatus may include instructions executable by the processor to: identify a timing instance from the wireless communication layer; identify an internal interface timing delay associated with each layer used to stream the content; adjust a timing of the multimedia layer to correspond to the timing instance from the wireless communication layer based at least in part on the internal interface timing delay; and determine a presentation time of a multimedia layer timing source by translating the presentation timestamp received with the streamed content based at least in part on the adjusted timing of the multimedia layer. The apparatus may include instructions executable by the processor to: receive, from the source device, timing information associated with the common timing source, the common timing source used for streaming content to the plurality of sink devices.

In a third set of illustrative examples, a method for wireless communication is provided. The method may include: identifying timing information associated with a common timing source associated with a source device used for streaming content to a plurality of sink devices; sending the timing information to at least one of the plurality of sink devices; streaming the content to the plurality of sink devices, wherein the presentation of the content is synchronized with the plurality of sink devices based at least in part on the timing information.

In some aspects, identifying the timing information may include: capturing, by a multimedia layer, a timing instance from a wireless communication layer; determining a departure time and an arrival time corresponding to the common timing source of the multimedia layer for each of the wireless transmissions and receptions of measurement frames to at least one of the plurality of sink devices; and sending an adjusted departure time and arrival time to at least one of the plurality of sink devices. The method may include performing at least two rounds of exchanging the timing measurement frames with at least one of the plurality of sink devices.

In some aspects, determining the departure time and the arrival time may include: determining an internal interface timing delay associated with communications between the multimedia layer and the wireless communication layer; and adjusting the departure time and the arrival time based at least in part on the internal interface timing delay.

In some aspects, the method may include identifying a timing instance from the wireless communication layer; identifying an internal interface timing delay associated with each layer used to stream the content; adjusting a timing of the multimedia layer to correspond to the timing instance from the wireless communication layer based at least in part on the internal interface timing delay; and deriving the presentation timestamp for content payload corresponding to the adjusted timing at the multimedia layer.

In some aspects, the common timing source may be associated with a generalized precision time protocol. The source device may communicate via peer-to-peer networks to the plurality of sink devices. The source device may communicate via an infra-structure network to the plurality of device.

In a fourth set of illustrative examples, an apparatus for wireless communication is provided. The apparatus may include: a processor; memory in electronic communication with the processor; and instructions being stored in the memory. The instructions may be executable by the processor to: identify timing information associated with a common timing source associated with a source device, the common timing source used for streaming content to a plurality of sink devices; send the timing information to at least one of the plurality of sink devices; stream the content to the plurality of sink devices, wherein the presentation of the content is synchronized with the plurality of sink devices based at least in part on the timing information.

In some aspects, the instructions to identify the timing information may be further executable by the processor to: capture, by a multimedia layer, a timing instance from a wireless communication layer; determine a departure time and an arrival time corresponding to the common timing source of the multimedia layer for each of the wireless transmissions and receptions of measurement frames to at least one of the plurality of sink devices; and send an adjusted departure time and arrival time to at least one of the plurality of sink devices.

In some aspects, the apparatus may include instructions executable by the processor to perform at least two rounds of exchanging the timing measurement frames with at least one of the plurality of sink devices. The instructions to determine the departure time and the arrival time further may be further executable by the processor to: determine an internal interface timing delay associated with communications between the multimedia layer and the wireless communication layer; and adjust the departure time and the arrival time based at least in part on the internal interface timing delay.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described embodiments are directed to systems and methods for timing synchronization between a source and multiple sink devices for content streaming and presentation. Generally, a sink device may receive timing information from a source device and determine a composite timing delay. The composite timing delay may be based on a common timing source (e.g., a timing reference shared by the source and all sink devices) on which the timing information is based. The sink device may adjust its timing, e.g., a timing at a multimedia layer, based on the timing delay and use the adjusted timing to synchronize the presentation of the content. The source device may send timing information to each of the plurality of sink devices to provide for synchronization between the source and each sink device based on a respective timing delay for each sink device. The source device may stream the content to the sink devices such that the presentation of the content is synchronized across the sink devices.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
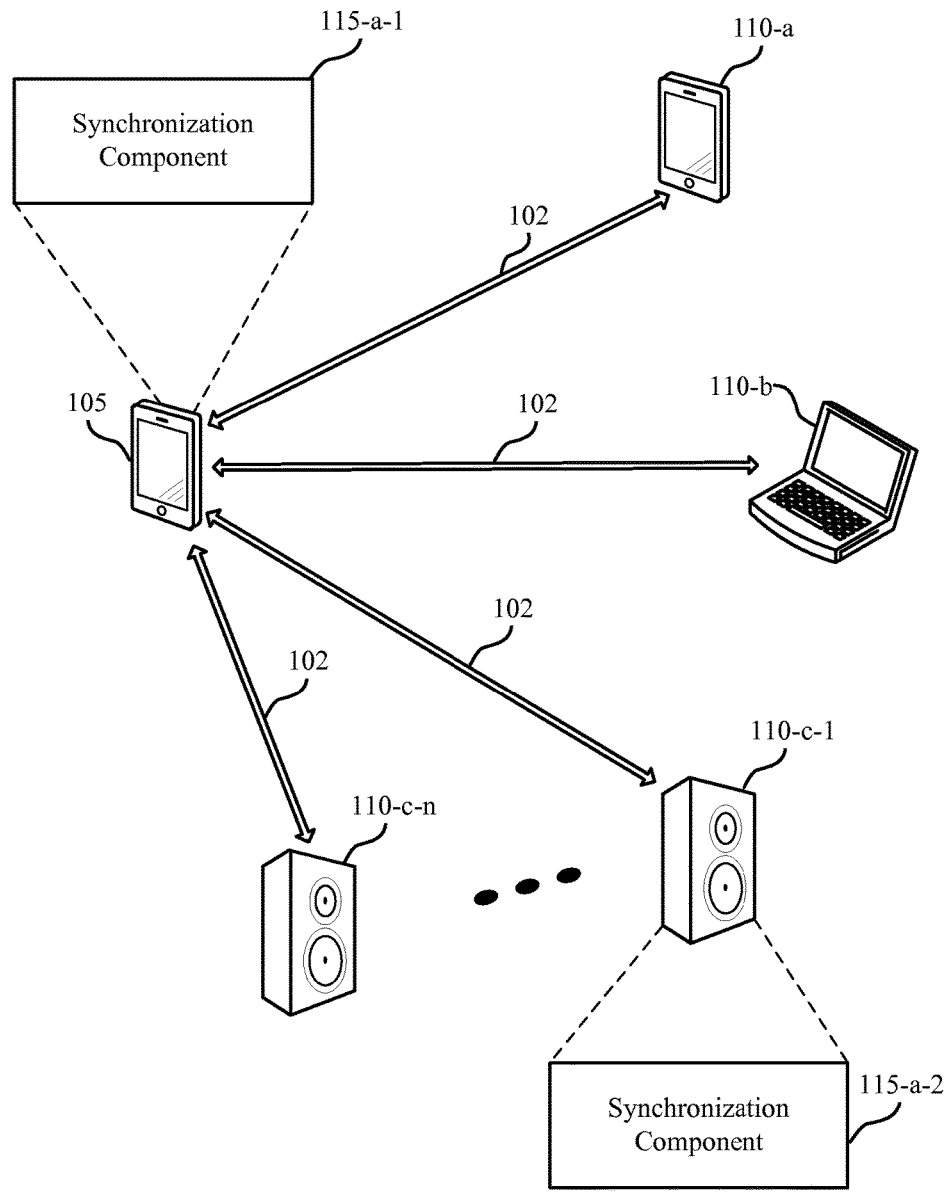
FIG. 1 shows a block diagram of a wireless communication system, in accordance with various aspects of the present disclosure.

Referring now to FIG. 1, a system 100 includes a source device 105 and a plurality of sink devices 110 and may include one or more access points for connecting these devices through infrastructure network (not shown). Examples of the source device 105 may include, but are not limited to, smartphones, cell phones, wearable computing devices, tablets, personal digital assistants (PDAs), laptops, or any other device capable of communicating with a sink device 110 via a link 102 (e.g., wired, cellular wireless, Wi-Fi, etc.). Examples of the sink devices 110 may include, but are not limited to, in-vehicle infotainment devices, TVs, computers, laptops, projectors, cameras, smartphones, speakers, wireless headphones, wearable computing devices, or any other device capable of communicating with a source device 105 and relaying (e.g., display or audio) content received from the source device 105. The sink devices 110 may be a combination of devices. For example, the sink device 110-c may include a multi-speaker configuration consisting of speakers 110-c-1 to 110-c-n, where n is a positive integer. In some examples, the source device 105 and each of the sink devices 110 may include a synchronization component 115 (e.g., synchronization component 115-a-1 and/or synchronization component 115-a-2) configured to execute the methods of the present disclosure. In some examples, the synchronization component 115 may be an example of synchronization component 215 described with reference to FIGS. 2-4.

Source device 105 may be connected to sink device 110 via link 102. Link 102 illustrated in FIG. 1 may be a wired or wireless link in some embodiments. Communications between a source device 105 and a sink device 110, connected via a wireless peer-to-peer connection, may be configured to remotely render content of the source device 105 at the sink devices 110. Wireless remote display includes, but is not limited to the Wi-Fi Display specification, also known as Miracast® from Wi-Fi Alliance, Discovery and Launch (DIAL), Digital Living Network Alliance® (DLNA), Airplay, WirelessHD, Wireless Home Digital Interface (WHDI), Intel's Wireless Display (Wi-Di) technology, and Ultra-wideband (UWB) connections. While the following techniques are described using the wireless networking architecture illustrated in FIG. 1, the described techniques are applicable to any suitable wired or wireless communication technology. Although the system 100 shows the source device 105 connected to sink device 110 via a peer-to-peer connection, it is to be understood that the present disclosure is not limited to peer-to-peer connections. Additionally or alternatively, the source device 105 may be connected to the sink device 110 via an infrastructure wireless connection where each device communicates via an access point (not shown).

In some examples, the link 102 between the source device 105 and sink devices 110 may be bi-directional. In one configuration, the connection between the source device 105 and a sink devices 110 may also allow users to launch applications stored on the source device 105 via the sink devices 110. For example, the sink devices 110 may include various input controls (e.g., mouse, keyboard, knobs, keys, user interface buttons). These controls may be used at the sink device 110 to initialize and interact during the audio/video streaming from the source through the media applications stored on the source device 105.

In one embodiment, the source device 105 may be connected to the sink devices 110 via a Wi-Fi Display connection. Wi-Fi Display protocol, which may be known as Miracast, allows a portable device or computer to transmit media content (e.g., video, audio, images, etc.) to a compatible display wirelessly. It enables delivery of compressed standard or high-definition video/audio over a link 102. It also may allow users to echo the display from one device onto the display of another device. It also may allow user to stream high definition audio content to a multiple speaker system (e.g., 5.1, 7.1, etc.) where each speaker would act as a sink device 110. A link 102 may be a direct wireless link (e.g., peer-to-peer link), or an indirect wireless link through a Wi-Fi access point (not shown). Examples of direct wireless links include Wi-Fi Direct connections and connections established by using a Wi-Fi Tunneled Direct Link Setup (TDLS) link.

In accordance with the present disclosure, system 100 may support synchronous streaming by configuring the source device 105 and each sink device to align with a common clock source, e.g., a common timing source. In some examples, the source device 105 may be configured such that the multimedia layer accesses a timing of the wireless communication layer and correlates the Wi-Fi timing to derive the presentation times of the content payloads. In some aspects, a clock source within the multimedia layer may be synchronized by estimating the actual local timing of the Wi-Fi subsystem to reduce the uncertainty/jitter in the interface between the multimedia layer and the Wi-Fi subsystem. The present description may allow adaptively adjusting the drifts between the timing sources of different sub-systems within a source device 105 and sink device 110 when using Wi-Fi layer timing measurements. Access of a timing source of the Wi-Fi subsystem at a regular interval and using it for providing synchronized presentation timing for content is also described.

In some aspects, the present disclosure may use timing measurements from the Wi-Fi layer or synchronized timing reference such as timing synchronization framework (TSF) at the multimedia stack or layer. Such low layer techniques may provide the highest synchronization accuracy for Wi-Fi system for meeting stringent synchronization standards for content streaming and presentation. The system 100 may be configured such that the delays and jitters in interfaces between the Wi-Fi system to other processor subsystems handling the media payload are considered and accounted for in the timing synchronization.

Thus, in accordance with the present disclosure, the source device 105 and the sink device 110 may each access a snapshot of the current time of the Wi-Fi subsystem from the multimedia layer. For example, the multimedia layer may access a TSF register or other timing counters or registers incremented using Wi-Fi clock source from a Wi-Fi firmware periodically, e.g., use a media access control (MAC) sub-layer management entity (MLME) timing measurement exchange that includes a vendor information element containing the Wi-Fi time. The source device 105 and sink device 110 may use the MLME primitives to initiate timing measurement frame exchanges that may include two rounds of timing measurement/acknowledgement frame exchanges. The basic timing measurement procedure for measuring the Wi-Fi link delay and clock offsets are provided by IEEE 802.11-2012 and IEEE 802.1AS standards. The source device 105 may track the time corresponding to the instant the measurement frames are transmitted and corresponding acknowledgment frame is received at the antenna port and report this timing information to the sink device 110 in the timing measurement frames in the second round. In this disclosure, the basic timing measurement framework based on 802.11-2012/802.1AS is extended to account for multiple sub-system interfaces within a device such that multimedia layer clock source can be used for synchronized timing reference by eliminating the jitter/uncertainty between higher layer interfaces with wireless transmission layer. The source device 105 may access the transmission and reception times in reference to the antenna port provided by its wireless communication layer to the multimedia layer and translate the timing to multimedia layer timing units which also include compensating for any interface delays the device is able to determine to maintain a locally adjusted common timing source. The locally adjusted timing source may be translated based on the Wi-Fi layer timing as well as the multimedia layer clock source, e.g., the program reference clock (PCR) used by MPEG transport systems.

The sink device 110 may capture its corresponding reception and transmission times in reference to the antenna port provided by its wireless communication layer to the multimedia layer and translate those times to multimedia layer timing units which also include compensating for any interface delays the device is able to determine to maintain the locally adjusted common timing source. Similarly, the locally adjusted timing source at the sink device 110 may be translated based on the knowledge of Wi-Fi layer timing by using the multimedia layer clock source, e.g., the PCR. The sink device 110 may, additionally, determine the transmission link delays based on the measurement frame exchange and adjust its local timing source in the multimedia layer accordingly. With the method described in this disclosure, very high accuracy of the delay estimation is possible as the multimedia layer is able to track the Wi-Fi layer timing locally and use it to determine the reception and transmission times accurately. This allows isolating any potential errors and timing jitters in the interface between the wireless layer and multimedia layer for exchange of timing information through software function calls, such as due to operating system (OS) scheduling, multiple threads or resource issues between multiple processing systems. For example, the sink device 110 may use the measurement frame exchange to calculate the transmission link delay, the peer rate ratio (clock drift rate), and the timing offsets with respect to the multimedia layer reference timing of the source device.

In accordance with other aspects of the present disclosure, the source device 105 and sink devices 110 may use the Wi-Fi subsystem clock as the primary clock source (e.g., the common timing source) and use presentation time stamping of the multimedia payload based on the Wi-Fi subsystem timing using the same reference as the common clock source. For example, the source device 105 may include the desired presentation time for the audio/video data as the timestamp of the first real-time transport protocol (RTP) packet of a packetized elementary stream (PES) payload. At the receiving side (e.g., at each sink device 110), the RTP protocol may pass the timing information to the multimedia layer and the multimedia subsystem may derive the presentation timestamp (PTS) or adjust the PTS based on the RTP timestamp.

Accordingly, the source device 105 and the sink device 110 may exchange timing information associated with a common timing source, where the timing information may be associated with a Wi-Fi subsystem timing. Based on the Wi-Fi subsystem timing information and, in some aspects, transmission link delays, internal interface delays, etc., provide for synchronized presentation of content streamed from the source device 105 to multiple sink devices 110. The content may be multimedia content, audio content, video content, etc.

Figure 2:
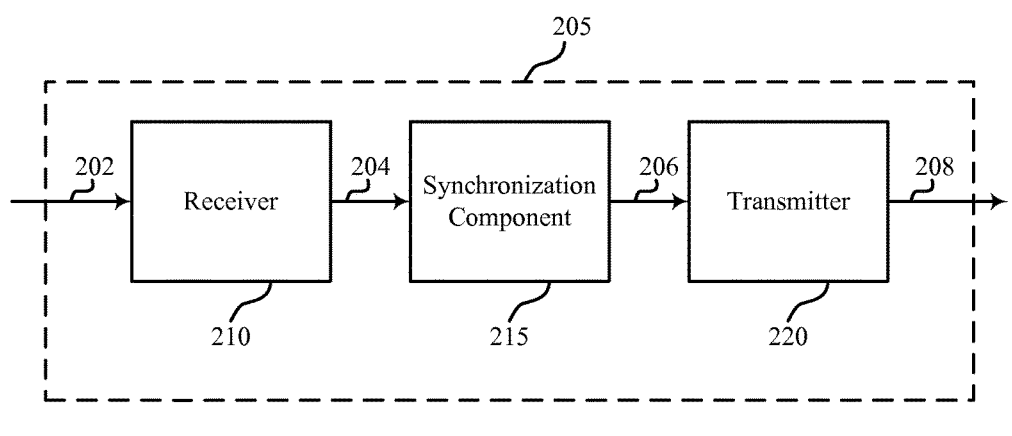
FIG. 2 shows a block diagram of a device configured for use in wireless communication, in accordance with various aspects of the present disclosure.

FIG. 2 shows a block diagram 200 of a wireless device 205 configured for synchronous content streaming service, in accordance with various aspects of the present disclosure. Wireless device 205 may be an example of aspects of a source device 105 and/or a sink device 110 described with reference to FIG. 1. Wireless device 205 may include a receiver 210, a synchronization component 215, or a transmitter 220. Wireless device 205 may also include a processor. Each of these components may be in communication with each other.

The components of wireless device 205 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 210 may receive information such as packets, user data, or control information associated with various information channels (e.g., control channels, data channels, and information related to synchronous content streaming service, etc.) over communication link 202. Information may be passed on to the synchronization component 215 via link 204, and to other components of wireless device 205.

The synchronization component 215 may monitor, manage, or otherwise control various aspects related to synchronous streaming of content. For example, when the wireless device 205 is utilized as a source (e.g., source device 105), the synchronization component 215 may identify timing information associated with a common timing source of a source device used for streaming content to a plurality of sink devices, send the timing information to at least one of the plurality of sink devices, and stream the content to the plurality of sink devices. The presentation of the content may be synchronized with the plurality of sink devices based at least in part on the timing information.

In another example, when the wireless device 205 is utilized as a sink (e.g., sink device 110), the synchronization component 215 may identify a composite timing delay associated with the common timing source, adjust a sink device timing based at least in part on the identified composite timing delay, and use the adjusted sink device timing to synchronize the presentation of content streamed from a source device to a plurality of sink devices.

The transmitter 220 may receive information from synchronization component 215 via link 206 and transmit signals 208 received from other components of wireless device 205. In some embodiments, the transmitter 220 may be collocated with the receiver 210 in a transceiver. The transmitter 220 may include a single antenna, or it may include a plurality of antennas.

Figure 3:
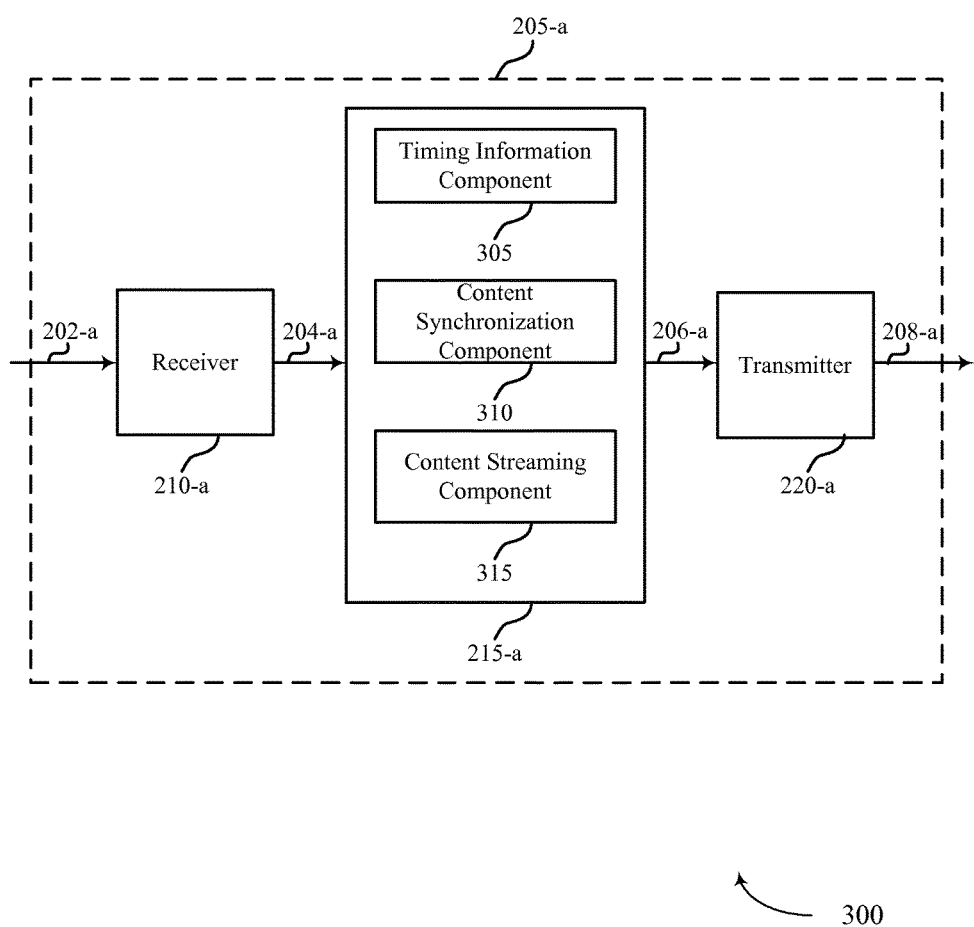
FIG. 3 shows a block diagram of a device configured for use in wireless communication, in accordance with various aspects of the present disclosure.

FIG. 3 shows a block diagram 300 of a wireless device 205-*a* configured for synchronous content streaming service, in accordance with various aspects of the present disclosure. Wireless device 205-*a* may be an example of aspects of a wireless device 205, a source device 105 or sink device 110 described with reference to FIGS. 1-2. Wireless device 205-*a* may include a receiver 210-*a*, a synchronization component 215-*a*, or a transmitter 220-*a*. Wireless device 205-*a* may also include a processor. Each of these components may be in communication with each other. The receiver 210-*a* and the transmitter 220-*a* may be examples of the receiver 210 and the transmitter 220 of FIG. 2, respectively, and may perform similar function(s). The synchronization component 215-*a* may also include a timing information component 305, a content synchronization component 310, and a content streaming component 315.

The timing information component 305 may monitor, manage, or otherwise control aspects of timing information for synchronous content streaming. Generally, timing information component 305 may manage timing information associated with a common timing source associated with streaming content from a source device to a plurality of sink devices. The common timing source may include or otherwise be related to a timing of a layer handling multimedia referred as a multimedia subsystem or layer or a Wi-Fi-subsystem timing, or combinations thereof.

In one example where the wireless device 205-*a* is utilized as a source device, the timing information component 305 may identify the timing information associated with the common timing source. The timing information component 305 may, in cooperation with the transmitter 220-*a*, send the timing information to a sink device. In some aspects, the timing information component 305 may identify the timing information by capturing, by the multimedia layer, a timing instance from a Wi-Fi layer. The timing information component 305 may determine a departure time and an arrival time corresponding to the common timing source of the multimedia layer for each of a wireless transmission and reception of measurement frames to at least one sink device. The timing information component 305 may send, in cooperation with the transmitter 220-*a*, the adjusted departure time and arrival time that correspond to the timing source of the multimedia layer to the sink device. The timing information component 305 may determine the departure time and the arrival time by determining an internal interface timing delay associated with communications between the multimedia layer and the Wi-Fi layer and adjust the departure time and arrival time to account for the internal interface delay while translating the Wi-Fi time to the timing source of multimedia layer. In some aspects, two rounds of the timing measurement frames may be exchanged with the sink device. In some examples, the common timing source may be associated with a generalized precision timing protocol (gPTP) based on IEEE 802.1AS standard.

In another example where the wireless device 205-*a* is utilized as a sink device, the timing information component 305 may, in cooperation with the receiver 210-*a*, receive the timing information from a source device. The timing information component 305 may identify a composite timing delay that may, in some aspects include a first timing source delay, a second timing source delay, or combinations thereof. In some examples, the first timing source delay may be associated with a multimedia layer and the second timing source delay may be associated with a Wi-Fi communication layer. Accordingly, the timing information component 305 may identify a transmission link delay associated with wireless communications via the Wi-Fi layer. The timing information component 305 may identify an internal interface link delay associated with communications between the Wi-Fi layer and the multimedia layer, e.g., each layer used to stream the content. The timing information component 305 may determine the composite timing delay based on the transmission link delay, the internal interface link delay, or combinations thereof. The timing information component 305 may adjust the timing of the sink device based on the composite timing delay.

In some aspects, the transmission link delay may be determined by performing at least two rounds of exchanging timing measurement and acknowledgement frames with the source device. The internal interface link delay may be associated, in some examples, with a delay for communications between the multimedia layer and the Wi-Fi layer in part for accessing the timing information, e.g., from the multimedia layer accessing the timing information from the Wi-Fi layer and the Wi-Fi layer reporting the same.

In some examples, the first timing source may be associated with the Wi-Fi layer and the second timing source may be associated with the multimedia layer. The timing information component 305 may identify a timing instance from the Wi-Fi layer by the multimedia layer. The timing information component 305 may identify an internal interface link or timing delay associated with each layer used to stream the content, e.g., the Wi-Fi and multimedia layers, and adjust the timing of the multimedia layer to correspond to the timing instance from the Wi-Fi layer based in part on or otherwise adjusted to account for the internal interface link delay.

The content synchronization component 310 may monitor, manage, or otherwise control aspects of content synchronization for the wireless device 205-*a*. In some aspects, the content synchronization may include presentation timing information included in the content payload streamed from the source device to the multiple sink devices.

As one example where the wireless device 205-*a* is utilized as a source device, the content synchronization component 310 may, alone or in combination with other component(s) of the wireless device 205-*a*, embed a presentation timestamp (PTS) into the payload of the content streamed to the multiple sink devices. For example, the content synchronization component 310 may communicate with a locally adjusted timer in the multimedia layer that includes timing units translated from the Wi-Fi layer to determine and timestamp the content for presentation. In one non-limiting example for audio streaming using MPEG2-TS, the PTS in each audio PES may be used.

In another example where the wireless device 205-*a* is utilized as a sink device, the content synchronization component 310 may, alone or in combination with other component(s) of the wireless device 205-*a*, retrieve the PTS from the streamed content and use the timestamp to determine presentation timing.

The content streaming component 315 may monitor, manage, or otherwise control one or more aspects of streaming the content from the source device to the multiple sink devices. For example, when the wireless device 205-*a* is used as a source device, the content streaming component 315 may cooperate with the transmitter 220-*a* to transmit the content to the multiple sink devices. In another example where the wireless device 205-*a* is used as a sink device, the content streaming component 315 may cooperate with the receiver 210-*a* to receive one or more frames including the multimedia payload from the source device.

Figure 4:
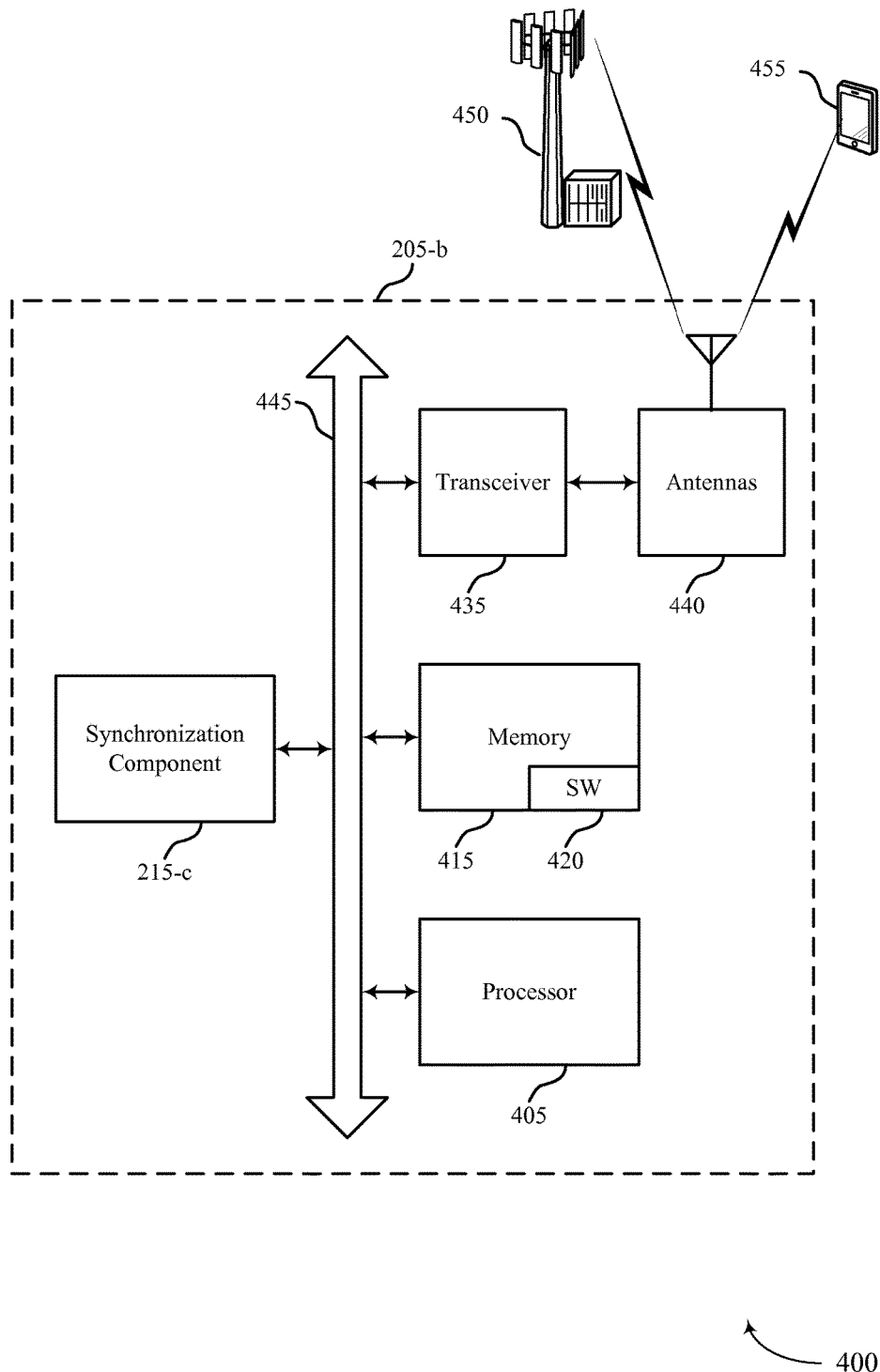
FIG. 4 shows a block diagram of a wireless communication system, in accordance with various aspects of the present disclosure.

FIG. 4 shows a diagram of a system 400 including a wireless device 205-*b* configured for synchronous multimedia streaming service, in accordance with various aspects of the present disclosure. System 400 may include wireless device 205-*b*, which may be an example of a wireless device 205, source device 105, and/or sink device 110 described above with reference to FIGS. 1-3. The wireless device 205-*b* may include a synchronization component 215-*c*, which may be an example of a synchronization component 215 described with reference to FIGS. 2-3. The wireless device 205-*b* may also include components for bi-directional voice and data communications including components for transmitting communications and components for receiving communications.

The wireless device 205-*b* may also include a processor 405, and memory 415 (including software (SW) 420), a transceiver 435, and one or more antenna(s) 440, each of which may communicate, directly or indirectly, with one another (e.g., via buses 445). The transceiver 435 may communicate bi-directionally, via the antenna(s) 440 or wired or wireless links, with one or more networks, as described above. For example, the transceiver 435 may communicate bi-directionally with access point 450 or wireless devices 455, which may be examples of a source device and/or a sink device. The transceiver 435 may include a modem to modulate the packets and provide the modulated packets to the antenna(s) 440 for transmission, and to demodulate packets received from the antenna(s) 440. While wireless device 205-*b* may include a single antenna 440, wireless device 205-*b* may also have multiple antennas 440 capable of concurrently transmitting or receiving multiple wireless transmissions.

The memory 415 may include random access memory (RAM) and read only memory (ROM). The memory 415 may store computer-readable, computer-executable software/firmware code 420 including instructions that, when executed, cause the processor 405 to perform various functions described herein (e.g., synchronization of presentation of content streamed from a source device to multiple sink devices, etc.). Alternatively, the software/firmware code 420 may not be directly executable by the processor 405 but cause a computer (e.g., when compiled and executed) to perform functions described herein. The processor 405 may include an intelligent hardware device, (e.g., a central processing unit (CPU), a microcontroller, an ASIC, etc.)

Figure 5:
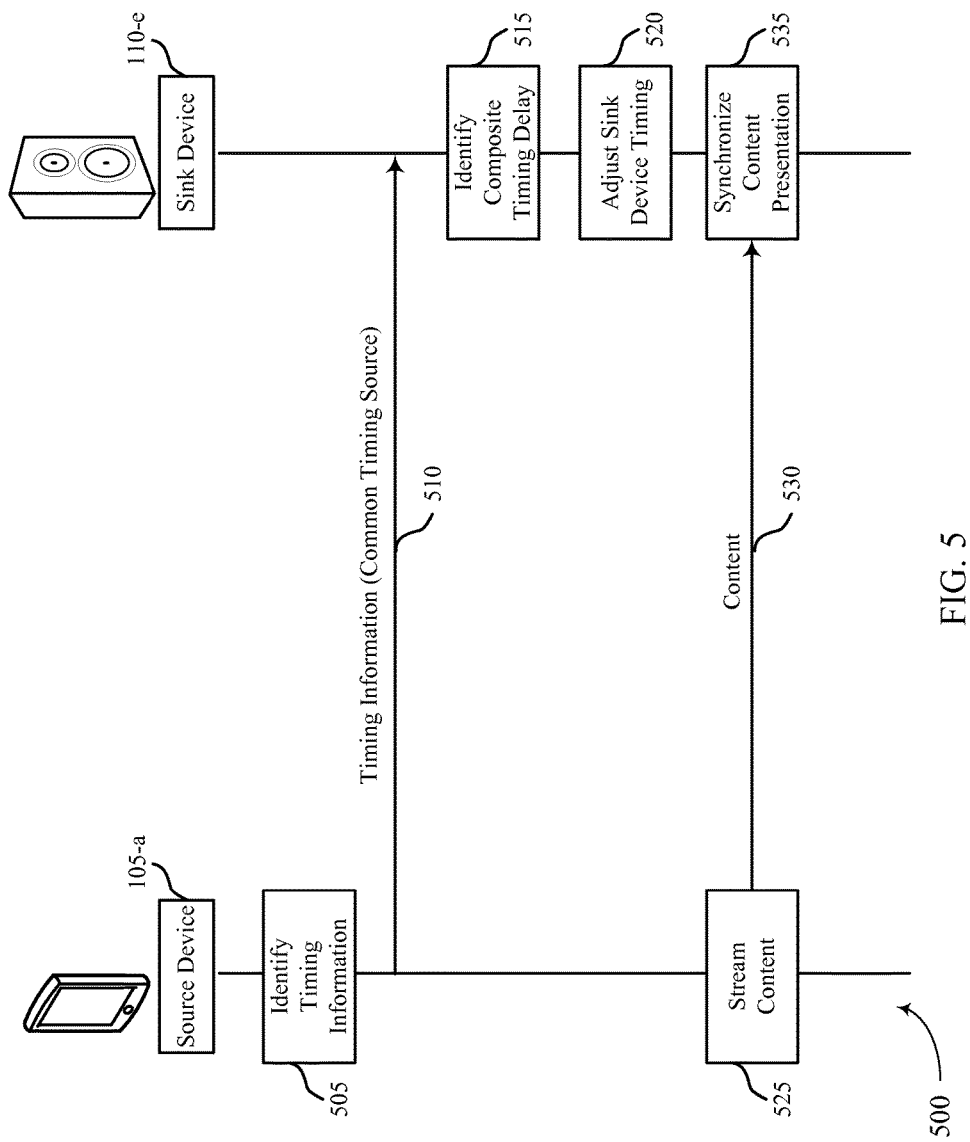
FIG. 5 shows a swim lane diagram illustrating aspects of wireless communication, in accordance with various aspects of the present disclosure.

FIG. 5 illustrates an example of a process flow 500 for wireless communication in accordance with various aspects of the present disclosure. Process flow 500 may include a source device 105-*a*, which may be an example of a source device 105 described with reference to FIG. 1. Process flow 500 may also include a sink device 110-*e*, which may be an example of a sink device 110 described above with reference to FIG. 1. The source device 105-*a* and/or the sink device 110-*e* may also be examples of the wireless device 205 described with reference to FIGS. 2-4. Although described with reference to a single sink device 110-*e*, the steps of process flow 500 may be used with a plurality of sink devices 110.

For example, in some cases, a source device 105 may wish to stream content to sink devices 110 that requires a certain degree of synchronization. For example, the sink devices 110 may include multiple speakers where each speaker (sink device 110) is responsible for presenting certain portions of the content within a predefined window to ensure that a listener will perceive the content in its intended form and timing. In another example where the sink devices 110 are multiple display devices, the streamed content may be synchronized such that viewers see the content without delay, flicker, etc. Accordingly, the source device 105 and sink devices 110 may use a lower layer timing source as a common timing source, e.g., a Wi-Fi layer, to synchronize the content and, in some aspects at the sink device 110 side, account for delays in transmission link signals to further improve presentation accuracy. Thus, the source device 105 and sink devices 110 may identify and account for a timing delay that includes transmission link delays as well as delays (at the source device 105 and the sink device 110) associated with internal processing subsystems, layers, stacks, etc., for each device. The composite timing delay may provide for presentation of the content across multiple sink devices with a high degree of synchronization.

At step 505, the source device 105-a may identify timing information associated with a common timing source used for streaming the content to the multiple sink devices 110. In some examples, the timing information may be or include information associated with departure times and arrival times for timing measurement frame exchanges where the time is based on or otherwise correlated to the common timing source. The common timing source may refer to a common timing reference that is shared by the source device 105-a and the sink device 110-e. At 510, the source device 105-a may send the timing information to the sink device 110-e. In one example, the source device 105-a may send the timing information during a second round of the timing measurement frame exchanges.

At 515, the sink device 110-e may receive the timing information and determine a composite timing delay. The composite timing delay may be associated with transmission link delays, internal interface link delays, or combinations thereof. For example, the sink device 110-e may determine the composite timing delay by accounting for delays in communicating timing information between a Wi-Fi layer and the multimedia layer as well as propagation delays in transmitting the timing information, e.g., timing measurement frames, from the source device 105-a to the sink device 110-e, and vice versa. Accordingly, the sink device may locally adjust its common timing source to account for, and therefore eliminate the effects of the composite timing delay.

At 520, the sink device 110-e may adjust its timing based on the timing information and the composite timing delay. For example, the multimedia layer of the sink device 110-e may access a time instance or snapshot of the Wi-Fi layer clock and correlate the timing information into timing units according to the multimedia layer clock. The sink device 110-e may adjust the local adjusted timing clock to account for the timing delay to ensure synchronization of the content presentation. At 525, the source device 105-a may stream the content to the sink device 110-e at 530. At 535, the sink device 110-e may present the content in a synchronized manner and according to the common clock source. In one example, the sink device 110-e may read the PTS from the content, and present the content based on the PTS according to its locally adjusted time clock that has adjusted the timing offset of its clock corresponding to the estimated link delay with respect to the clock of the source device 105-a.

Figure 6:
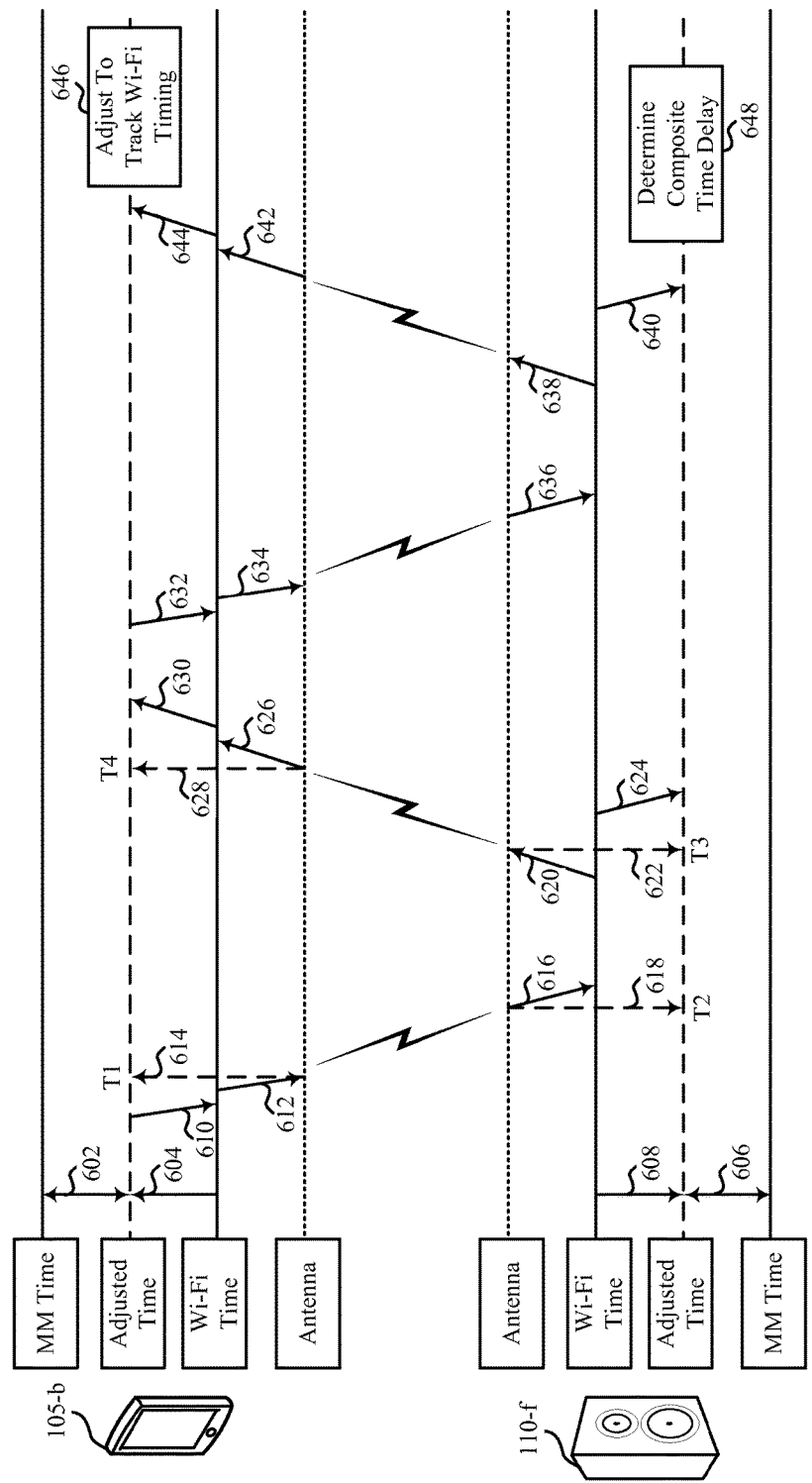
FIG. 6 shows a diagram illustrating an example measurement frame exchange for use in wireless communication, in accordance with various aspects of the present disclosure.

FIG. 6 illustrates an example of a timing flow 600 for wireless communication in accordance with various aspects of the present disclosure. Timing flow 600 may include a source device 105-b, which may be an example of a source device 105 described with reference to FIG. 1. Timing flow 600 may also include a sink device 110-f, which may be an example of a sink device 110 described above with reference to FIG. 1. The source device 105-b and/or the sink device 110-f may also be examples of the wireless device 205 described with reference to FIGS. 2-4. Although described with reference to a single sink device 110-f, the steps of timing flow 600 may be used with a plurality of sink devices 110.

The source device 105-b may include a multimedia subsystem or layer that includes a multimedia (MM) time and a locally adjusted time. The source device 105-b may also include a wireless communication subsystem or layer that includes a Wi-Fi time and an antenna for the wireless transmissions and receptions, which is used as a reference point for measuring the link delay by all sink devices. Similarly, the sink device 110-f may include a multimedia layer having its own multimedia time and locally adjusted time and a wireless communication layer having its own Wi-Fi time and antenna for the wireless transmissions and receptions, which is used as a reference point for measuring the link delay to with respect to the source device.

Generally, the timing flow 600 may use the locally adjusted clock in the multimedia layer for both time stamping of measurement frames for timing measurements, and for content payload time stamping. Additionally, the timing flow 600 may be used to remove the jitter or other problems typically associated with sharing timing information between the multimedia layer and the Wi-Fi layer interfaces. In some examples, a media clock (e.g., audio or video clock) or a MPEG2-TS clock (PCR) may be used as a common timing source according to the timing flow 600.

At 602/604, at the source device 105-b the multimedia layer may access a snapshot of the current time in the Wi-Fi time and store this information for deriving the locally adjusted clock of the source device 105-b. Similarly at 606/608, at the sink device 110-f the multimedia layer may access a snapshot of the current time in the Wi-Fi time and store this information for deriving the locally adjusted clock of the sink device 110-f. For example, the multimedia layer may access a TSF register or any other timing counters or registers incremented using Wi-Fi clock source from the Wi-Fi firmware periodically without a noticeable delay or jitter for such access (e.g., not more than 2 microseconds access delay). Any proprietary primitive or commands may be used to access the Wi-Fi time, e.g., the MLME-TIMINGMSMT.confirm or and MLME-TIMINGMSMT.indication primitive at the first exchange for timing measurements that can include a vendor IE containing the Wi-Fi time, or a register read of the timing counters may be provided by the Wi-Fi firmware to its host driver. For example, the MLME-GETTSFTIME.request/.confirm service primitives specified by IEEE 802.11-2012 standard may also be used.

At 610, the source device 105-b (the initiating device) may start a timing measurement frame exchange procedure that includes sending a request message from the timing measurement entity (e.g., 802.1AS software) that may use a locally adjusted clock to provide timing to the Wi-Fi layer MAC that is responsible for generating the timing measurement frames. Generally, the source device 105-b may use MLME primitives to initiate the timing measurement frame exchange and may complete two rounds of Timing Measurement (TM) and acknowledgement (ACK) exchange as shown in timing flow 600. Accordingly at 610, the locally adjusted clock of the source device 105-b may send a MLME-TIMINGMSMT.request primitive that includes a vendor information element that includes the timing of the locally adjusted clock.

The source device 105-b may track its time corresponding to the instant the timing measurement frames are transmitted or received at the antenna port, and provides these time values for the TM frames. As one non-limiting example, the Wi-Fi clock time at a time $t_0$ may be $T_{hw}(t0)$, and the corresponding time at the multimedia layer may be $T_{mm}(t_0)$. The locally adjusted time clock may record and store these values when the Wi-Fi time is accessed and for any other timing point, $t_n$, it may estimate the Wi-Fi time by translating the time difference using its own clock, as $T_{hw}(t_n)=T_{hw}(t_0)+[T_{mm}(t_n)-T_{mm}(t_0)]$.

The first timing measurement exchange may include the Wi-Fi layer MAC measuring the actual time of departure of a measurement frame by adding the time offset it takes for the signal 612 to leave the antenna port to its current clock time and record this time corresponding to T1 at 614. The TM frame may be wireless communicated to and received at the antenna port of the sink device 110-f at time T2, which may be recorded by the locally adjusted clock of the sink device 110-f. The frame received at the antenna may be processed by the Wi-Fi layer MAC and the time of arrival at 616 will be measured by compensating the known processing since the arrival of the frame at its antenna port. The sink device 110-f may then respond with an ACK signal at 620. The instant the ACK frame leaves the antenna port of the sink device 110-f may be captured as T3 corresponding to the 622. At 624, the Wi-Fi layer may communicate a MLME-TIMINGMSMT.indication to the timing measurement entity in multimedia layer to provide the T2 and T3 timings in reference to Wi-Fi timing domain. The timing measurement entity in the multimedia layer then uses the locally adjusted clock to translate the T2 and T3 timing information in reference to the multimedia clock reference that include removing the interface delay as well as clock offset for the estimated link delay with respect to the multimedia clock of the source device.

The time the ACK frame is received at the antenna port of the source device 105-b may be captured as T4 and recorded at 628. The ACK frame information may be communicated to the Wi-Fi layer at 626 which may convey a MLME-TIMINGMSMT.confirm message to the timing measurement entity in multimedia layer to provide the T4 timings in reference to Wi-Fi timing domain. The timing measurement entity in the multimedia layer then uses the locally adjusted clock of the source device 105-b at 630. As shown in the timing flow 600, the times associated with communicating the timing information between the Wi-Fi layer and the multimedia layer may also be measured and recorded.

A second timing measurement exchange may begin at 632 when the timing measurement entity initiates the exchange by sending another MLME-TIMINGMSMT.request to the Wi-Fi layer that includes, inter alia, T1 and T4. The Wi-Fi layer may transmit the TM frame at 634. The TM frame may be received at the antenna port of the sink device 110-f and conveyed to the Wi-Fi layer at 636. The Wi-Fi layer may respond with an ACK frame at 638 that is wirelessly conveyed to the source device 105-b. At 640, the Wi-Fi layer sends another MLME-TIMINGMSMT.indication message to the timing measurement entity in multimedia layer of the sink device 110-f that includes information associated with the T1-T4 timing measurements. At 648, the sink device 110-f may translate the T1-T4 timing measurements into the locally adjusted clock units as well as compute the wireless communication link delay with respect to the source device as well as the clock drift ratio with the reference clock source and any internal interface links.

At 642, the ACK frame is conveyed to the Wi-Fi layer which responds by sending another MLME-TIMINGMSMT.confirm message to the timing measurement entity in multimedia layer of the source device 105-b at 644. At 646, the locally adjusted clock of the source device 105-b may be adjusted to track the Wi-Fi timing.

Accordingly and at the source device 105-b (which may be considered the clock master), the timing values T1 and T4 received in the clock domain of Wi-Fi layer from the first frame exchange may be translated to the multimedia layer timing units based on the local estimate of the Wi-Fi clock that it can maintain, by using $T1=T_{mm}(t_1)=T_{mm}(now)-[T_{hw}(now)-t_1]$ and similarly the T4 by translating $T_{hw}(t_4)$ to $T_{mm}(t_4)$. At the sink device 110-f (which may be considered the clock slave), the timing values T2 and T3 received in the clock domain of the Wi-Fi layer from the first frame exchange may be translated to the multimedia timing units based on the local estimate of the Wi-Fi clock that it can maintain: $T2=T_m(t_2)=T_{mm}(now)-[T_{hw}(now)-t_2]$ and similarly the T3 by using $T_m(t_3)$ corresponding to $T_{hw}(t_3)$.

Figure 7:
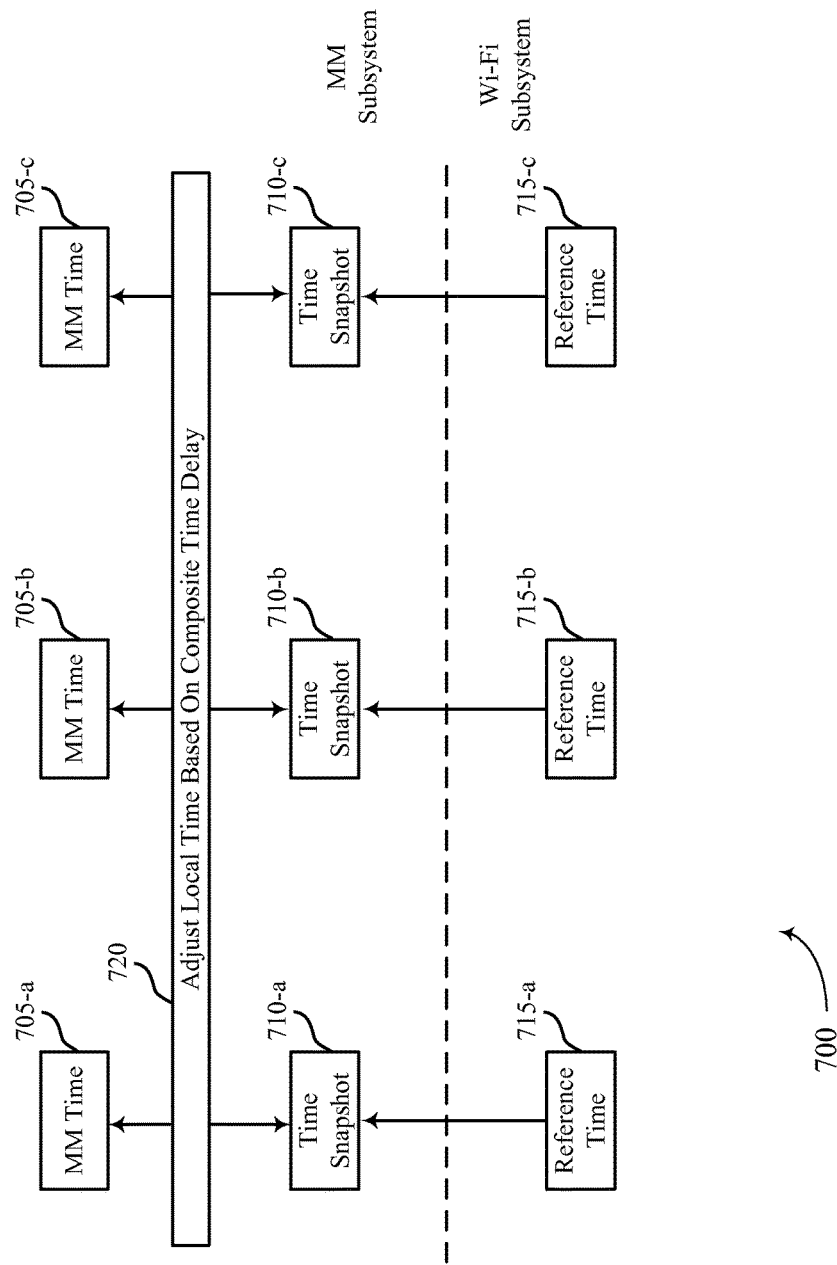
FIG. 7 shows a block diagram illustrating aspects of wireless communication, in accordance with various aspects of the present disclosure.

FIG. 7 illustrates an example diagram 700 for wireless communication in accordance with various aspects of the present disclosure. Diagram 700 may include a multimedia time 705 (e.g., MM time 705-a, MM time 705-b, and MM time 705-c), a time snapshot 710 (e.g., Time Snapshot 710-a, Time Snapshot 710-b, and Time Snapshot 710-c) and a reference time 715 (e.g., Reference Time 715-a, Reference Time 715-b, and Reference Time 715-c). The components illustrated in the diagram 700 may be examples of similar components of a source device 105, a sink device 110, and/or a wireless device 205 described with reference to FIGS. 1-6. Although described with reference to a single sink device, the steps of diagram 700 may be associated with a plurality of sink devices 110.

Generally, the diagram 700 illustrates timing reference for PTS of the multimedia payload frames. Generally, when using a generalized precision timing protocol (gPTP), the PTS may be in the timing unit set by the source device in its locally adjusted timing source (PTP, UTC, NTP, GPS, etc.) which may be used for timing measurement reference in the gPTPdomain. When using TSF, PTS may be provided by using the lowest 33 bits of the TSF (in 1 us), or a unit scale based on the TSF. Generally, the synchronization method that is used by all devices may be specified, and the time units for PTS may be included in the specification. In some aspects, the PCR may still be communicated but may be ignored by the sink devices. All devices may utilize the common timing reference based on the master clock source of the synchronization method, e.g., the locally adjusted time of the source device.

In some aspects, the diagram 700 may include capture of reference time 715 at the time snapshot 710 (e.g., the locally adjusted time) and may use translation or correlation logic (software PLL) to scale timing between different sub-systems of the source device and/or the sink device when the time-stamping of the media payload is required. As one non-limiting example, the PTS time desired at any instant $t_n$ in the multimedia clock domain may be based on the time at Wi-Fi layer at $t_0$ and derived as, $T_{hw}(t_n)=T_{hw}(t_0)+[T_{mm}(t_n)-T_{mm}(t_0)]$. In some aspects, the access of the reference time 715 from Wi-Fi subsystem and estimations of relative drifts of the multimedia layer clock to the Wi-Fi clock may be done using the same functions described with reference to timing flow 600.

In some aspects, the multimedia layer time 705 may accesses the time snapshot 710 at some periodic intervals (e.g., 100 ms) and translate its desired presentation times to the time snapshot 710 timing reference. The multimedia clock time 705 may be used to derive the corresponding time snapshot 710 time at any instant for payload time-stamping. The drifts between successive access intervals may not be significant enough for consideration or may be adjusted from drift rate estimations (as discussed above). Accordingly, the timestamps can be made to be in synch with the time snapshot 710 time, e.g., the locally adjusted time of the device. This approach may be used irrespective of how the clocks of Wi-Fi subsystem of different devices are synchronized. Therefore, if the TSF method is used for Wi-Fi synchronization, the same approach may also be used. In some examples, the diagram 700 may also access the actual time from the reference time 715 in real-time by hardware interface. However, periodic access with negligible delay and local tracking of the timing may be sufficient for many use cases.

In some aspects, the diagram 700 may use the RTP timestamps or PTS directly from the time snapshot 710 timing reference while transmitting the content packets. The RTP timestamp may be co-located with the Wi-Fi subsystem and the receiving device uses RTP timestamp for de-jittering, similar to the techniques described in Miracast R1 standard. At the same time, the RTP timestamp of the first RTP packet of the PES payload may be passed from the RTP layer to multimedia stack. This may allow use of time snapshot 710 also for the media presentation time. The additional constraint of relaying the time snapshot 710 from Wi-Fi layer to multimedia stack at the receiving device may be necessary to ensure very tight timing synchronization for rendering of media between multiple devices, such as synchronous streaming of surround audio.

Figure 8:
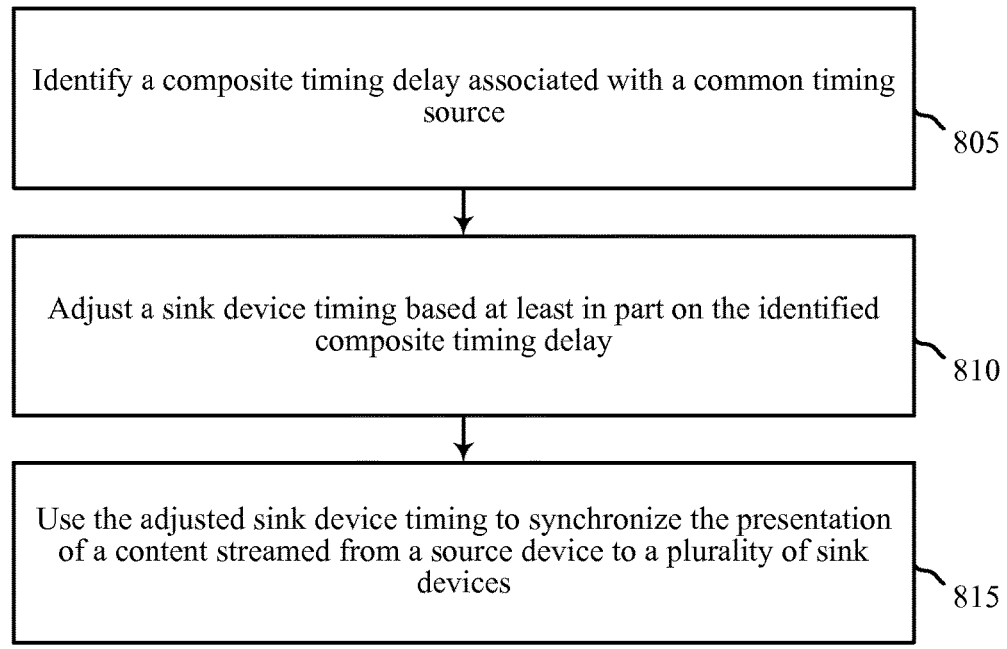
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of a sink device 110 and/or a wireless device 205 described with reference to FIGS. 1-7. In some examples, a sink device may execute sets of codes to control the functional elements of the sink device to perform the functions described below. Additionally or alternatively, the sink device may perform the functions described below using-purpose hardware.

At block 805, the method 800 may include the sink device receiving timing information from a source device. The timing information may be associated with or indicative of a common timing source used for streaming content to a plurality of sink devices. At 810, the method 800 may include the sink device identifying a composite timing delay associated with the common timing source. The composite timing delay may consider and account for wireless transmission link delay, internal interface delays, or combinations thereof.

At 815, the method 800 may include the sink device adjusting its timing based at least in part on the identified composite timing delay. For example, the sink device may adjust a locally adjusted timing clock based on the composite timing delay. At 820, the method 800 may include the sink device using the adjusted timing to synchronize the presentation of the content streamed from the source device. For example, the sink device may read a PTS included in the payload of the streamed content and use its locally adjusted timing clock to determine when to present the content.

The operation(s) at blocks 805, 810, 815, and 820 may be performed using the synchronization component 215 described with reference to FIGS. 2-4.

Thus, the method 800 may provide for wireless communication. It should be noted that the method 800 can be just one implementation and that the operations of the method 800 may be rearranged or otherwise modified such that other implementations are possible.

Figure 9:
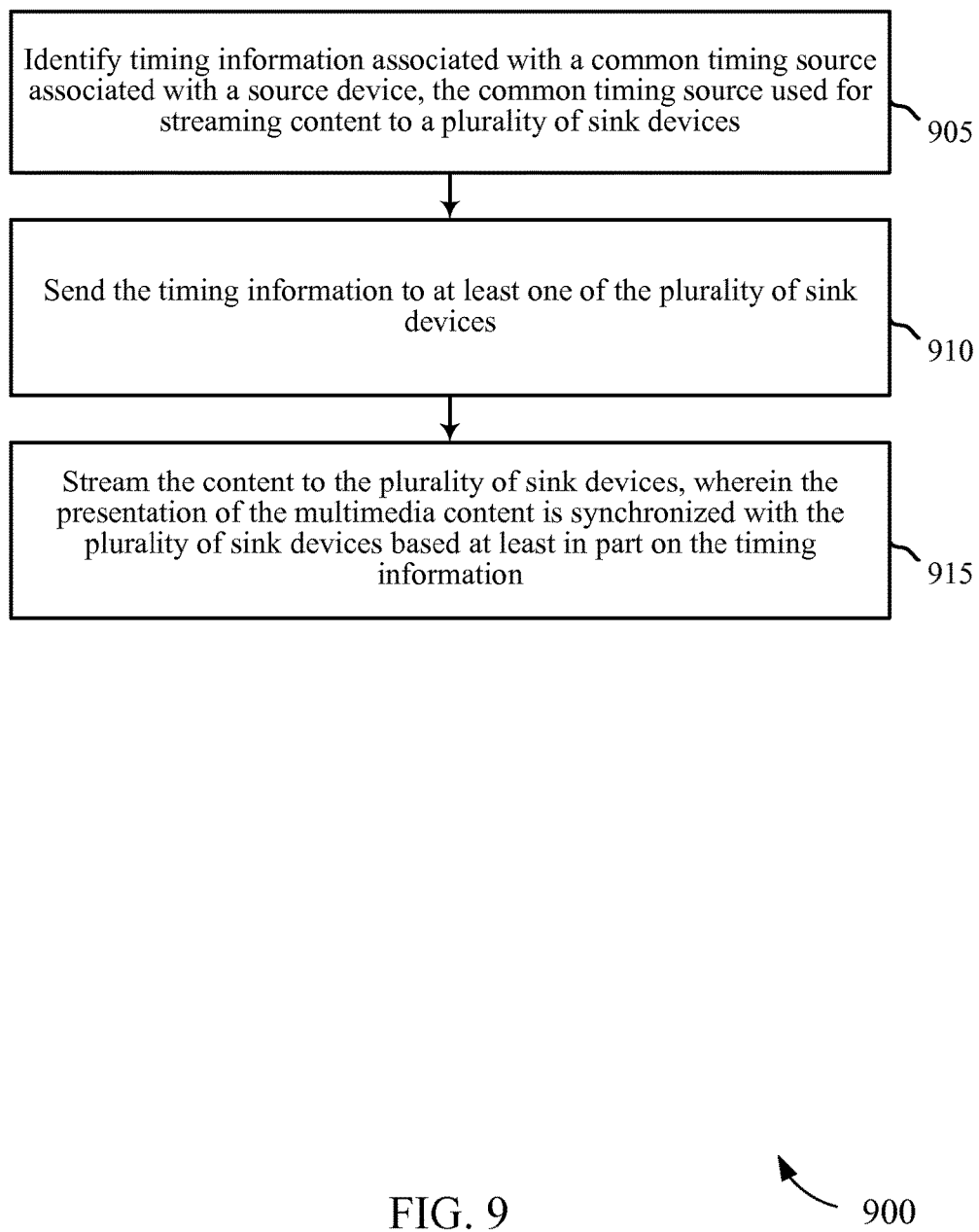
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of a source device 105 and/or a wireless device 205 described with reference to FIGS. 1-7. In some examples, a source device may execute sets of codes to control the functional elements of the source device to perform the functions described below. Additionally or alternatively, the source device may perform the functions described below using-purpose hardware.

At block 905, the method 900 may include the source device identifying timing information associated with or indicative of a common timing source used for streaming content to a plurality of sink devices. At 910, the method 900 may include the source device sending the timing information to at least one of the plurality of sink devices. The timing information may be sent via one or more TM frames communicated during a timing measurement exchange.

At 915, the method 900 may include the source device streaming the content to the plurality of sink devices. The presentation of the content may be synchronized with the plurality of sink devices based at least in part on the timing information. For example, the sink device may adjust a locally adjusted timing clock based on the timing information and use the adjusted timing to synchronize the presentation of the content streamed from the source device. In one example, the sink device may read a PTS included in the payload of the streamed content and use its locally adjusted timing clock to determine when to present the content.

The operation(s) at blocks 905, 910, and 915 may be performed using the synchronization component 215 described with reference to FIGS. 2-4.

Thus, the method 900 may provide for wireless communication. It should be noted that the method 900 can be just one implementation and that the operations of the method 900 may be rearranged or otherwise modified such that other implementations are possible.

Figure 10:
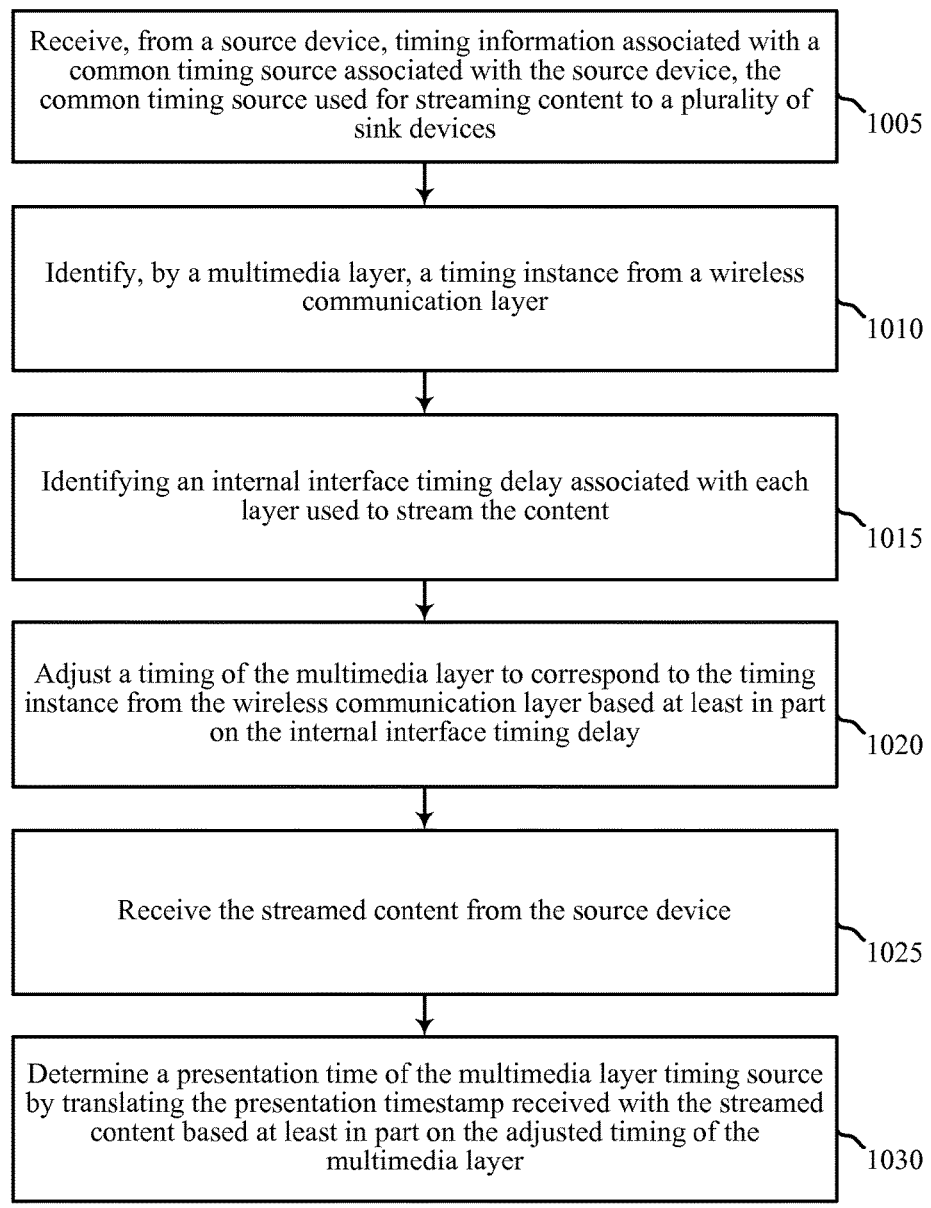
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of a sink device 110 and/or a wireless device 205 described with reference to FIGS. 1-7. In some examples, a sink device may execute sets of codes to control the functional elements of the sink device to perform the functions described below. Additionally or alternatively, the sink device may perform the functions described below using-purpose hardware.

At block 1005, the method 1000 may include the sink device receiving timing information from a source device. The timing information may be associated with or indicative of a common timing source used for streaming content to a plurality of sink devices. At 1010, the method 1000 may include a multimedia layer of the sink device identifying a timing instance from a wireless communication layer, e.g., a Wi-Fi layer. The timing instance may be correlated with the timing units of the multimedia layer. At 1015, the method 1000 may include the sink device identifying an internal interface link delay associated with each layer used to stream the content. The internal interface link delay may be associated with the exchanges of the timing information from the Wi-Fi layer to the multimedia layer.

At 1020, the method 1000 may include the sink device adjusting the timing of its multimedia layer to correspond to the timing instance from the Wi-Fi layer and based at least in part on the internal interface link delay. At 1025, the method 1000 may include the sink device receiving the streamed content from the source device. At 1030, the method 1000 may include the sink device determining a presentation time of the multimedia layer timing source by translating the presentation timestamp received with the streamed content based at least in part on the adjusted timing of the multimedia layer.

The operation(s) at blocks 1005, 1010, 1015, 1020, 1025, and 1030 may be performed using the synchronization component 215 described with reference to FIGS. 2-4.

Thus, the method 1000 may provide for wireless communication. It should be noted that the method 1000 can be just one implementation and that the operations of the method 1000 may be rearranged or otherwise modified such that other implementations are possible.

In some examples, aspects from two or more of the methods 800, 900, and/or 1000 may be combined. It should be noted that the methods 800, 900, etc. are just example implementations, and that the operations of the methods 800-1000 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures, and that can be accessed by a general-purpose or special-purpose computer, or a general-purpose or special-purpose processor. Also, any connection can be properly termed a computer-readable medium. For example, if the software can be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for streaming content in a wireless communication system, comprising:
- receiving, at a sink device, timing information associated with a common timing source, wherein the timing information is based at least in part on a timing instance from a source device wireless communication layer, and captured by a source device multimedia layer, wherein the source device wireless communication layer is different from the source device multimedia layer;
- identifying, by the sink device, a composite timing delay associated with the common timing source based at least in part on an adjustment to a time of communication identified by a sink device wireless communication layer, and the timing information, wherein the adjustment is based at least in part on a timing of a sink device multimedia layer, and wherein the sink device wireless communication layer is different from the sink device multimedia layer;
- adjusting, by the sink device, a sink device timing based at least in part on the identified composite timing delay; and
- using, by the sink device, the adjusted sink device timing to synchronize presentation of the content streamed from the source device to a plurality of sink devices.

2. The method of claim 1, wherein the identified composite timing delay comprises at least one of a first timing source delay, a second timing source delay, or a combination thereof.

3. The method of claim 2, wherein the first timing source delay is associated with the source device multimedia layer and the second timing source delay is associated with the source device wireless communication layer.

4. The method of claim 3, further comprising:
- identifying a transmission link delay associated with wireless communications via the source device wireless communication layer;
- identifying an internal interface timing delay associated with each layer used to stream the content, the identified composite timing delay based at least in part on the transmission link delay and the internal interface timing delay; and
- adjusting the timing of the sink device multimedia layer based at least in part on the identified composite timing delay.

5. The method of claim 4, wherein identifying the transmission link delay comprises:
- performing at least two rounds of exchanging timing measurement and acknowledgement frames with the source device, wherein performing a round comprises exchanging a first timing measurement frame and a first acknowledgment frame with the source device.

6. The method of claim 4, wherein the internal interface timing delay is associated with a delay for communications between the source device multimedia layer and the source device wireless communication layer in part for accessing the timing information associated with the common timing source.

7. The method of claim 2, wherein the first timing source delay is associated with the sink device wireless communication layer and the second timing source delay is associated with the sink device multimedia layer.

8. The method of claim 7, further comprising:
- identifying a timing instance from the sink device wireless communication layer;
- identifying an internal interface timing delay associated with each layer used to stream the content;
- adjusting the timing of the sink device multimedia layer to correspond to the timing instance from the sink device wireless communication layer based at least in part on the internal interface timing delay; and
- determining a presentation time of a multimedia layer timing source by translating a presentation timestamp received with the streamed content based at least in part on the adjusted timing of the sink device multimedia layer.

9. The method of claim 1, wherein the common timing source is associated with a generalized precision time protocol.

10. The method of claim 1, wherein the plurality of sink devices communicate with the source device via either peer-to-peer networks, an infrastructure network, or a combination thereof.

11. The method of claim 1, further comprising:
- receiving, from the source device, the timing information associated with the common timing source, the common timing source used for streaming the content to the plurality of sink devices.

12. The method of claim 1, wherein the content is at least one of a multimedia content, an audio content, a video content, or combinations thereof.

13. An apparatus for streaming content in a wireless communication system, comprising:
- a processor;
- memory in electronic communication with the processor; and
- instructions being stored in the memory, the instructions being executable by the processor to:
- receive timing information associated with a common timing source, wherein the timing information is based at least in part on a timing instance from a source device wireless communication layer, and captured by a source device multimedia layer;
- identify, by the sink device, a composite timing delay associated with the common timing source based at least in part on an adjustment to a time of communication identified by a sink device wireless communication layer, wherein the sink device wireless communication layer is different from the source device wireless communication layer, and the timing information, wherein the adjustment is based at least in part on a timing of a sink device multimedia layer, wherein the sink device multimedia layer is different from the source device multimedia layer;
- adjust a sink device timing based at least in part on the identified composite timing delay; and
- use the adjusted sink device timing to synchronize presentation of the content streamed from the source device to a plurality of sink devices.

14. The apparatus of claim 13, wherein the identified composite timing delay comprises at least one of a first timing source delay, a second timing source delay, or a combination thereof.

15. The apparatus of claim 14, wherein the first timing source delay is associated with the source device multimedia layer and the second timing source delay is associated with the source device wireless communication layer.

16. The apparatus of claim 15, further comprising instructions executable by the processor to:
- identify a transmission link delay associated with wireless communications via the source device wireless communication layer;
- identify an internal interface timing delay associated with each layer used to stream the content, the identified composite timing delay based at least in part on the transmission link delay and the internal interface timing delay; and adjust the timing of the sink device multimedia layer based at least in part on the identified composite timing delay.

17. The apparatus of claim 16, wherein the instructions to identify the transmission link delay are further executable by the processor to:

perform at least two rounds of exchanging timing measurement and acknowledgement frames with the source device, wherein performing a first round of exchange comprises exchanging a first timing measurement frame and a first acknowledgment frame with the source device.

18. The apparatus of claim 16, wherein the internal interface timing delay is associated with a delay for communications between the source device multimedia layer and the source device wireless communication layer in part for accessing the timing information associated with the common timing source.

19. The apparatus of claim 14, wherein the first timing source delay is associated with the sink device wireless communication layer and the second timing source delay is associated with the sink device multimedia layer.

20. The apparatus of claim 19, further comprising instructions executable by the processor to:

identify a timing instance from the sink device wireless communication layer;

identify an internal interface timing delay associated with each layer used to stream the content;

adjust the timing of the sink device multimedia layer to correspond to the timing instance from the sink device wireless communication layer based at least in part on the internal interface timing delay; and determine a presentation time of a multimedia layer timing source by translating a presentation timestamp received with the streamed content based at least in part on the adjusted timing of the sink device multimedia layer.

21. The apparatus of claim 14, wherein the content is at least one of a multimedia content, an audio content, a video content, or combinations thereof.

22. A method for streaming content in a wireless communication system, comprising:

identifying, by a source device, timing information associated with a common timing source based at least in part on an adjustment to a time of communication identified by a source device wireless communication layer, wherein the adjustment is based at least in part on a timing of a source device multimedia layer, the common timing source used for streaming the content to a plurality of sink devices, and wherein identifying the timing information comprises, capturing, by the source device multimedia layer, a timing instance from the source device wireless communication layer;

sending, by the source device, the timing information to at least one of the plurality of sink devices; and streaming, by the source device, the content to the plurality of sink devices, wherein presentation of the content is synchronized with the plurality of sink devices based at least in part on the timing information.

23. The method of claim 22, wherein identifying the timing information comprises:

determining a departure time and an arrival time corresponding to the common timing source for each wireless transmission and reception of timing measurement frames to at least one of the plurality of sink devices; and sending an adjusted departure time and arrival time to at least one of the plurality of sink devices.

24. The method of claim 23, further comprising:

performing at least two rounds of exchanging the timing measurement frames with at least one of the plurality of sink devices, wherein performing a round of exchange comprises exchanging a first timing measurement frame and a first acknowledgment frame with the source device.

25. The method of claim 23, wherein determining the departure time and the arrival time further comprises:

determining an internal interface timing delay associated with communications between the source device multimedia layer and the source device wireless communication layer; and adjusting the departure time and the arrival time based at least in part on the internal interface timing delay.

26. The method of claim 22, further comprising:

identifying an internal interface timing delay associated with each layer used to stream the content;

adjusting the timing of the source device multimedia layer to correspond to the timing instance from the source device wireless communication layer based at least in part on the internal interface timing delay; and deriving a presentation timestamp for a content payload corresponding to the adjusted timing of the source device multimedia layer.

27. An apparatus for streaming content in a wireless communication system, comprising:

a processor;

memory in electronic communication with the processor; and instructions being stored in the memory, the instructions being executable by the processor to:

identify timing information associated with a common timing source based at least in part on an adjustment to a time of communication identified by a source device wireless communication layer, wherein the adjustment is based at least in part on a timing of a source device multimedia layer, the common timing source used for streaming the content to a plurality of sink devices, and wherein identifying the timing information comprises, capturing, by the source device multimedia layer, a timing instance from the source device wireless communication layer;

send the timing information to at least one of the plurality of sink devices; and stream the content to the plurality of sink devices, wherein presentation of the content is synchronized with the plurality of sink devices based at least in part on the timing information.

28. The apparatus of claim 27, wherein the instructions to identify the timing information are further executable by the processor to:

determine a departure time and an arrival time corresponding to the common timing source for each wireless transmission and reception of timing measurement frames to at least one of the plurality of sink devices; and send an adjusted departure time and arrival time to at least one of the plurality of sink devices.

29. The apparatus of claim 28, further comprising instructions executable by the processor to:

perform at least two rounds of exchanging the timing measurement frames with the at least one of the plurality of sink devices, wherein performing a round of exchange comprises exchanging a first timing measurement frame and a first acknowledgment frame with the source device.

30. The apparatus of claim 28, wherein
the instructions to determine the departure time and the arrival time further are further executable by the processor to:
determine an internal interface timing delay associated with communications between the source device multimedia layer and the source device wireless communication layer; and
adjust the departure time and the arrival time based at least in part on the internal interface timing delay.

* * * * *